United States Patent [19]
Park

[11] Patent Number: 4,670,832
[45] Date of Patent: Jun. 2, 1987

[54] RESONANT INVERTER HAVING IMPROVED CONTROL AT ENABLEMENT

[75] Inventor: John N. Park, Rexford, N.Y.

[73] Assignee: General Electric Company, Schenectady, N.Y.

[21] Appl. No.: 873,575

[22] Filed: Jun. 12, 1986

[51] Int. Cl.[4] .......................................... H02M 3/335
[52] U.S. Cl. ........................................ 363/98; 363/17; 363/56
[58] Field of Search ....................... 363/17, 41, 56, 98, 363/132

[56] References Cited
U.S. PATENT DOCUMENTS
4,443,844 4/1984 Grace ................................ 363/98 X
4,502,105 2/1985 Jessee ................................ 363/98 X
4,541,041 9/1985 Park et al. ............................... 363/41

Primary Examiner—Peter S. Wong
Attorney, Agent, or Firm—Marvin Snyder; James C. Davis, Jr.

[57] ABSTRACT

Improved control of a resonant inverter upon enablement from a disabled state is achieved by restricting, to a frequency remote from resonance, the rectangular wave signal applied to the resonant circuit immediately subsequent to enablement, and by controllably sweeping the rectangular wave signal frequency toward resonance until a desired output voltage or current is reached. Closed loop variation of the rectangular wave signal frequency applied to the resonant circuit is employed to maintain a constant output voltage or current once the desired value is reached.

14 Claims, 5 Drawing Figures

RESONANT INVERTER HAVING IMPROVED CONTROL AT ENABLEMENT

This invention relates to resonant inverters and, more particularly, to such inverter having an improved control for operating the inverter immediately following enablement from a disabled state and thereafter to provide a desired, substantially constant output voltage or current to a load.

Operating dc-ac inverters with a resonant circuit offers several advantages; for example, such inverters are capable of operating with low switching losses and exhibit reduced electromagnetic interference. However, due to the resonant nature of the circuit, output voltage or current control of such inverters during varying input power or load conditions may not be achieved through the use of usual control techniques.

One preferred resonant inverter control method involves varying the frequency of a rectangular wave signal supplied to the resonant circuit via closed loop control. Such closed loop frequency control of resonant inverters, although generally effective, may suffer from certain shortcomings under particular circumstances. A commonly assigned patent and co-pending application involve solutions to two such shortcomings.

Commonly assigned U.S. Pat. No. 4,541,041, of Park et al., incorporated by reference herein, addresses the problem of excessive circulating currents in the resonant elements of a voltage fed series resonant inverter with closed loop frequency control, during no-load and light load operating conditions. The solution described therein comprises adjusting the duty cycle of the frequency signal produced by the control such that the frequency signal is provided to the controllable switch means in bursts during low load conditions, thereby minimizing circulating currents while maintaining the load voltage.

Co-pending, commonly assigned application of Park et al. entitled, "Resonant Inverter With Improved Control", Ser. No. 866,818, incorporated by reference herein, addresses the problem of loss of output power control with a resonant inverter having closed loop frequency feedback during extended or light load conditions. The disclosed solution comprises combining a closed loop frequency control mode with a closed loop phase shift control mode and automatically switching between the two modes as necessary to maintain a desired load voltage or current.

One additional problem associated with closed loop frequency control of resonant inverters which has yet to be addressed in any known patent or publication, is the occurrence of excessive peak circulating currents or voltages in the resonant elements immediately following enablement of the inverter from a disabled state (i.e., excessive tank currents in series-connected resonant circuits and excessive tank voltages in parallel-connected resonant circuits) and the related occurrence of load voltage or current overshoot of, and subsequent oscillation about, a desired output level.

Excessive peak circulating currents within, or voltages across, the resonant elements immediately following enablement of an inverter having closed loop frequency control may exist due to a combination of factors. Typically, a resonant inverter will be switched between enabled and disabled states as changes in needed output power occur. During these state changes, however, the closed loop frequency control circuitry will normally remain activated. Thus, when the inverter is in a disabled state (zero output voltage or current), there will appear to the control circuitry to be a large error in output (compared with the commanded output voltage or current). In response to this apparent error, the control circuitry will attempt to operate the inverter at a frequency which would maximize its output. Due to the resonant nature of the circuit, this attempted operating frequency will be at or near the circuit's resonant frequency. Thus, when the inverter is enabled from a disabled state, the inverter operates at or near resonance. Operation of the inverter at or near the circuit's resonant frequency produces the excessive circulating currents within, or voltages across, the inverter's resonant elements. In addition, the control circuitry will continue to operate the inverter's controllable switch means at or near resonance for a time interval (i.e., the integration time) after a desired output voltage or current has been reached. This response time delay inherent in the control circuitry produces the noted output voltage or current overshoot of, and subsequent oscillation about, the desired output voltage or current. Both of these results may be unacceptable and can lead to excessive power dissipation in components and/or a required overdesign of components. Depending upon the application, they may even make it impossible to use a resonant inverter.

Therefore, there presently exists a genuine need for a closed loop frequency controlled resonant inverter having improved operating control following enablement of the inverter from a disabled state.

SUMMARY OF THE INVENTION

Accordingly, a principal object of the present invention is to provide a resonant inverter having improved control following enablement from a disabled state.

Another object of the present invention is to provide a resonant inverter with improved control which reduces circulating currents within, or voltage across, the inverter's resonant elements immediately following inverter enablement from a disabled state.

Yet another object of the present invention is to provide a resonant inverter with improved control which provides a desired output voltage or current without an initial overshoot of, and subsequent oscillation about, a desired output voltage or current following enablement of the inverter from a disabled state.

Still another object of the present invention is to provide a resonant inverter with improved control which maintains a desired output voltage or current once reached.

Briefly, in accordance with a preferred embodiment of the invention, a resonant inverter having controllable switch means which provides a rectangular wave signal to a resonant circuit is operated with an improved control. The control comprises stabilizing means for varying the frequency of the rectangular wave signal within an operable range of the inverter's controllable switch means in such a manner as to maintain a desired load voltage or current. In addition, the control includes enablement means which initiates switching of the controllable switch means at a rectangular wave signal frequency within the operable range of the switch means and remote from that end of the range nearest resonance, and which controllably sweeps the rectangular wave signal frequency toward the end nearest resonance until the desired output voltage or current has been obtained. A resonant inverter controlled by these stabilizing and enablement means exhibits improved load voltage or current control both at enablement and thereafter.

The invention also includes a method for controlling load voltage or current from a resonant inverter having controllable switch means by switching the controllable switch means at a rectangular wave signal frequency within the operable range of the controllable switch means and remote from that end of the range nearest resonance, and controllably sweeping the rectangular wave signal frequency towards the end nearest resonance until a desired output voltage or current has been obtained, and thereafter varying the frequency of the rectangular wave signal within the operable range of the controllable switch means in such a manner as to maintain the desired load voltage or current.

BRIEF DESCRIPTION OF THE DRAWINGS

While the specification concludes with claims particularly pointing out and distinctly claiming the present invention, the objects, features and advantages of the invention can be more readily ascertained from the following detailed description of a preferred embodiment when read in conjunction with the accompanying drawings in which:

DETAILED DESCRIPTION OF THE INVENTION

Figure 1:
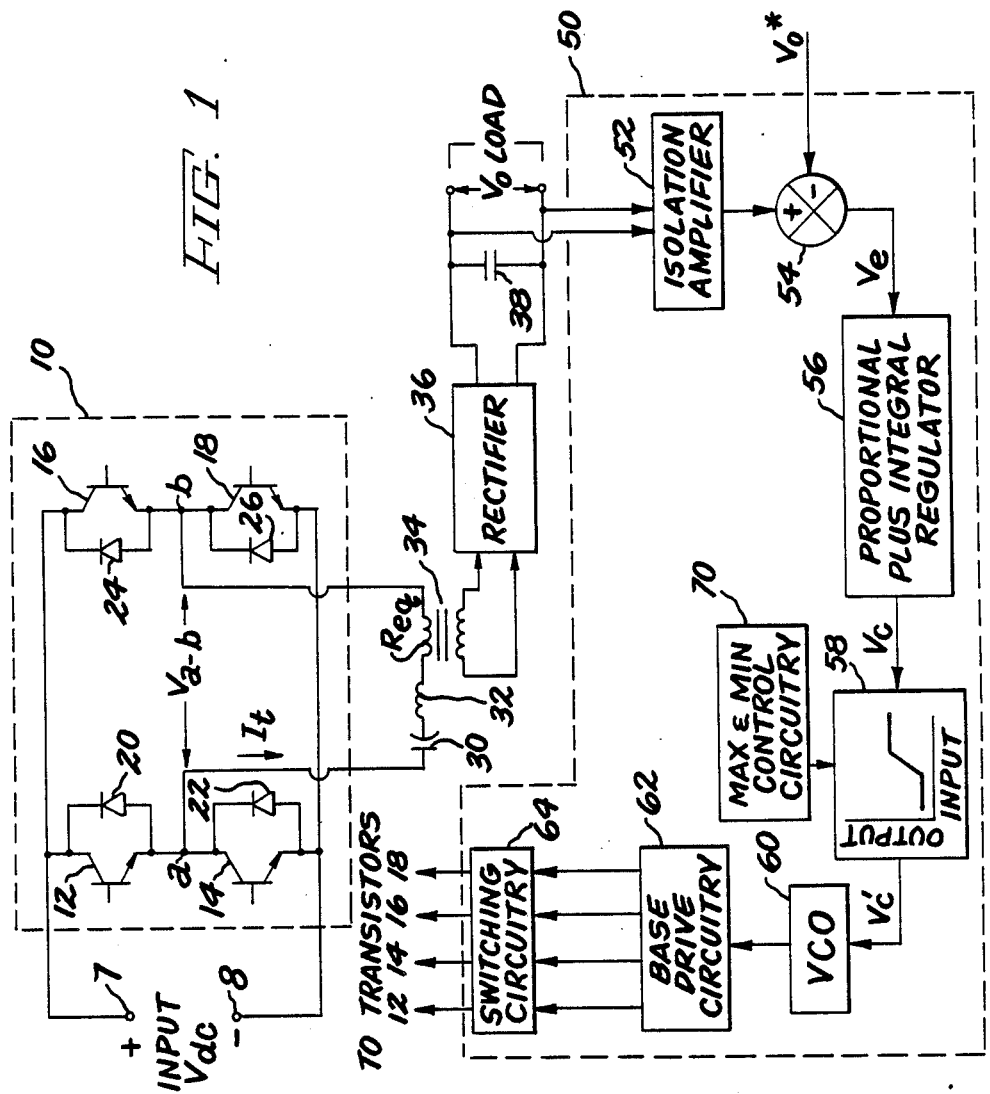
FIG. 1 is a part schematic, part block diagram representation of a series resonant inverter having closed loop frequency control.

The present invention will now be described with reference to the resonant dc-dc converter shown in FIG. 1. An external source (not shown) provides input dc power at terminals 7 and 8. Connected across terminals 7 and 8 is a full bridge inverter 10. Inverter 10 includes four switching devices which are capable of carrying reverse current and capable of being turned off by a switching signal. The switching devices are shown as bipolar junction power transistors 12, 14, 16 and 18, each switching device having an inverse diode 20, 22, 24 and 26 connected in parallel, respectively. The full bridge inverter is illustrated for purposes of description and it is to be understood that the control technique of the present invention is not limited to such an inverter. Similarly, other switching devices with gate turn-off capability could be used instead of the parallel-connected transistor-diode combination. Such switching devices include power metal-oxide semiconductor field effect transistors (MOSFETs) (reverse current carried by an integral parasitic diode), monolithic Darlingtons (reverse current carried by a parasitic diode), insulated gate transistors (IGTs) and gate turn-off silicon controlled rectifiers each having a diode connected in inverse parallel. The output of inverter 10 is available across junctions a and b between series-connected transistors 12 and 14, and series-connected transistors 16 and 18, respectively.

Connected between junctions a and b is a series resonant circuit comprises a capacitor 30, an inductor 32, and the primary winding of a transformer 34. The secondary winding of transformer 34 is connected to the input of a full wave rectifier 36. The output of full wave rectifier 36 is connected in parallel with a filter capacitor 38 and a load (not shown) across which the converter output is produced. An equivalent resistance $R_{eq}$ is reflected back into the series resonant circuit through transformer 34.

Output voltage $V_o$ is also supplied to a closed loop frequency control circuit 50. Voltage $V_o$ is initially applied to an isolation amplifier 52 which also acts as a buffer. The output of voltage isolation amplifier 52 is compared in summer 54 with the commanded output voltage $V_o^*$ and a resulting error signal $V_e$ is supplied to a proportional plus integral regulator circuit 56 which results in a first control signal $V_c$ at the input to a limit amplifier circuit 58. The regulator 56 does not invert its input signal. Limit amplifier circuit 58, in normal operation, provides a maximum output signal in response to a maximum control signal $V_c$ range and a minimum output signal in response to a minimum control signal $V_c$ range. The curve shown in box 58 denoting the limit amplifier circuit represents the transfer function of the limit amplifier, the x-axis representing the input control signal $V_c$ and the y-axis representing the output signal $V_c'$. As discussed below, limit circuit 58 essentially functions to constrain the frequency of the rectangular wave voltage $V_{a-b}$ available across junctions a and b, within the operable range o of transistors 12, 14, 16 and 18 (indicated in FIG. 2). These constraints are controlled by maximum and minimum control circuitry 70, described in greater detail in conjunction with FIG. 5. The output signal $V_c'$ from limit circuit 58 is a second control signal which, when provided to voltage controlled oscillator 60, results in a corresponding signal being supplied to base drive circuitry 62, the frequency of which is dependent on amplitude of second control signal $V_c'$. Base drive circuitry 62 in turn provides switching signals for transistors 12, 14, 16 and 18 of inverter 10 through switching circuitry 64.

In operation, resonant inverter 10 typically alternates between an enabled and a disabled state, primarily because it is conservationally beneficial to run inverter 10 only during those time intervals during which power output is actually needed. The enablement and disablement of inverter 10 typically occurs in response to a state switching command, and the state switching rate depends upon the particular purpose for which the resonant inverter is being used. In the embodiment illustrated in FIG. 1, the state switching function is carried out by inverter state switching circuitry 64 between the output of base drive circuitry 62 and transistors 12, 14, 16 and 18 of inverter 10. Thus when the inverter is in a disabled state, switching circuitry 64 prevents the base drive signals produced by base drive circuitry 62 from switching transistors 12, 14, 16 and 18 into conduction, resulting in a zero voltage $V_{a-b}$ and a zero output voltage $V_o$.

Under normal operation, control 50 remains active even while inverter 10 is in a disabled state. Thus, with inverter 10 in a disabled state, the base drive signals produced by base drive circuitry 62 are of a frequency which would otherwise be necessary for inverter 10 to produce the commanded voltage $V_o^*$. While inverter 10 is in a disabled state and output voltage $V_o$ is zero, it will appear that there is a large error in output voltage and control 50 responds by producing from base drive circuit 62 a base drive signal frequency at or near the inverter resonant frequency $F_r$ (since maximum output voltage is achieved at or near resonance—see FIG. 2). However, to keep inverter 10 in a disabled state, switching circuitry 64 prevents the base drive signals produced by control 50 from reaching inverter 10, thus guaranteeing that control 50 will continue attempting to switch transistors 12, 14, 16 and 18 at or near their resonant frequency.

Figure 3:
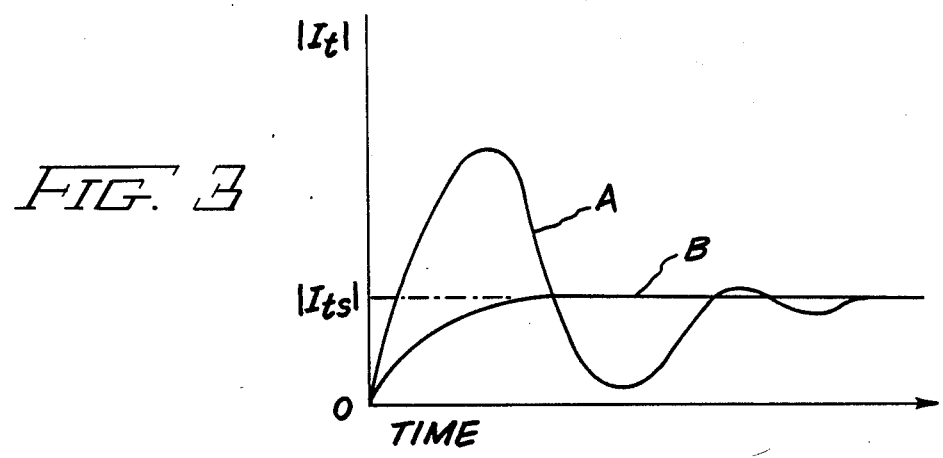
FIG. 3 shows typical waveforms of the magnitude of tank current plotted against time after enablement of the inverter of FIG. 1 from a disabled state, both without (waveform A) and with (waveform B) the improved control of the present invention.

Upon enablement of inverter 10 from a disabled state, the base drive signals from circuitry 62 are supplied by inverter state switching circuit 64 to transistors 12, 14, 16 and 18, causing the transistors to switch at or near the inverter resonant frequency. Since control 50 initiates operation of the resonant inverter at a frequency $F_{start}$ at or near resonance, there is a transient interval during which the magnitude of the tank current $|I_t|$ peaks and rings before eventually settling at a steady state value $|I_{ts}|$ (see FIG. 3, waveform A). This peaking and ringing of tank current upon enablement of the inverter is indicative of the response experienced in any resonant circuit which is started at or near resonance, and can result in excessive power dissipation in the circuit components. The problem is particularly acute for those inverters having resonant circuits with high Q values. The present invention, therefore, provides an improved control which eliminates this tank current peaking and ringing immediately following enablement of the resonant inverter.

Figure 4:
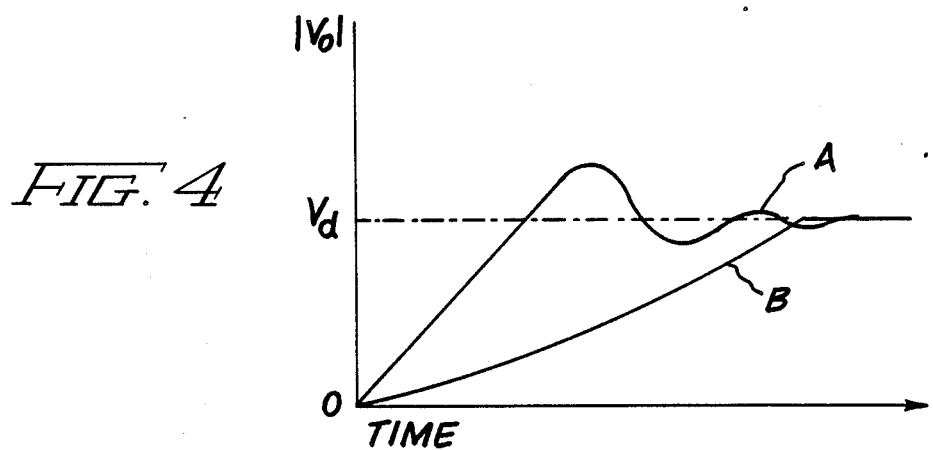
FIG. 4 shows typical waveforms of the magnitude of the output voltage plotted against time after enablement of the inverter of FIG. 1 from a disabled state, both without (waveform A) and with (waveform B) the improved control of the present invention.

In addition to appearance of excessive tank current immediately following enablement of inverter 10, there is typically a time interval during which output voltage $V_o$ overshoots and then oscillates about the desired output voltage $V_d$ (see FIG. 4, waveform A). This output voltage $V_o$ overshoot and subsequent oscillatory state is the result of an integration time delay within control 50 (specifically due to the averaging action carried out by proportional plus integral regulator 56). This essentially means that control 50 cannot respond instantaneously to changes in load voltage and therefore does not recognize that a desired output voltage has been reached until it has overshot it. This same principle produces the subsequent oscillations about the desired value. The present invention, therefore, also provides improved control to eliminate both the overshoot, and subsequent oscillation, of output voltage $V_o$ following enablement of inverter 10.

Figure 2:
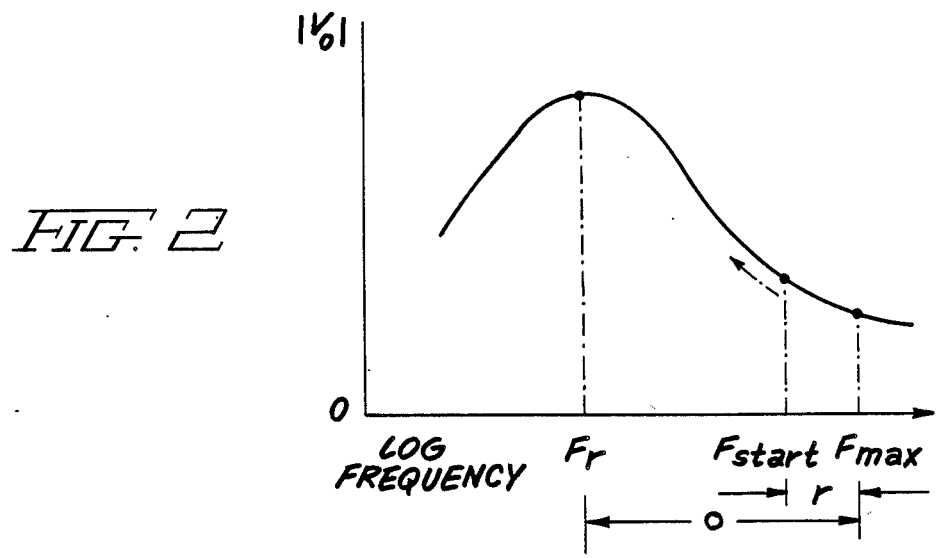
FIG. 2 is a typical waveform diagram showing the magnitude of the output voltage plotted against the log of the frequency of the rectangular wave signal suppled to the series circuit of the inverter of FIG. 1.

The present invention overcomes the above-noted problems by restricting the frequency of the base drive signals produced by base drive circuitry 62 before, during and immediately following enablement of inverter 10, to a reduced range r remote from that end of the transistors' operable range nearest resonance (see FIG. 2). Although control 50 attempts to produce switching signals at a frequency as close to resonance as possible while inverter 10 is in a disabled state (due to the larger error signal it is producing), the presence of a reduced, remote operating range r limits the actual switching signal produced to a frequency remote from resonance. By limiting the switching signal to a frequency remote from resonance, (i.e., a high frequency for the embodiment discussed and illustrated in FIG. 1), the resonant circuit across junctions a and b tends to respond as an inductive circuit would upon enablement of inverter 10, thus eliminating the tank current peaking and ringing exhibited when starting a resonant circuit at or near resonance (see FIG. 3, waveform B). Subsequent to enablement of inverter 10, the reduced remote operating range r is controllably enlarged until it coincides with the inverter's operable range o. By controllably enlarging the reduced range of operation of inverter 10, the frequency at which the inverter transistors are switched approaches resonance in a controlled manner (assuming control 50 continues to produce a large error signal). Thus, by appropriately selecting the time it takes the switching signal frequency to sweep toward resonance to exceed the integration time required by control 50 to effect control, a smooth transition of the output load voltage $V_o$ from zero to the desired value $V_d$ can be obtained (see FIG. 4, waveform B).

Figure 5:
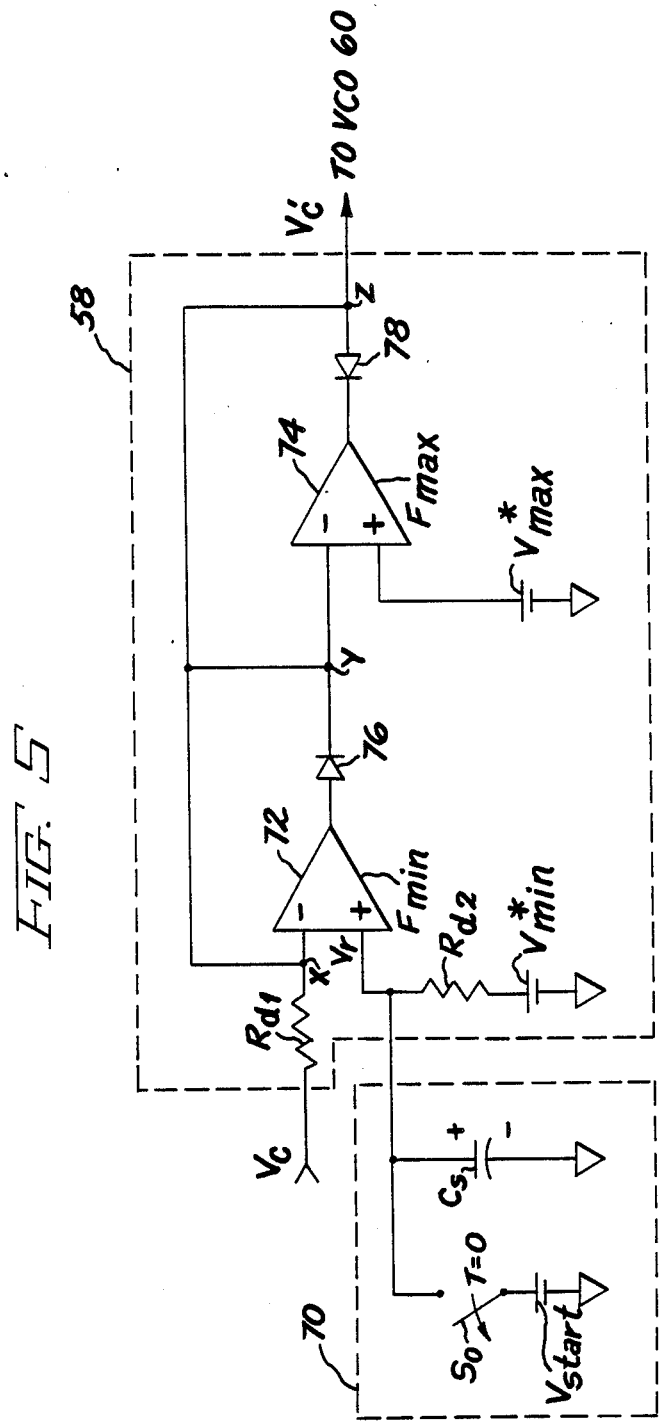
FIG. 5 is a schematic representation of one embodiment of the improved control of the present invention.

One embodiment of the limit circuit 58 employed in improved control 50 of the present invention will now be described with reference to FIG. 5. As already noted, limit circuit 58 functions to constrain the value of the control signal supplied to voltage controlled oscillator 60 such that the base drive signal produced by control 50 is within the operable range o of transistors 12, 14, 16 and 18 of inverter 10. Limit circuit 58 accomplishes this by constraining second control signal $V_c'$ to a value between certain minimum and maximum values $V_{min}$ and $V_{max}$, respectively. These minimum and maximum values of $V_c'$ are typically those values translatable into the frequency extremes within the transistors' operable range o as predetermined, in order to provide maximum closed loop frequency control of output voltage.

Limit circuit 58 includes a first operational amplifier 72 and a second operational amplifier 74 which cooperate to clamp the value of an input control signal $V_c$ between $V_{min}$ and $V_{max}$. The minimum value $V_{min}$ is equivalent to the reference signal $V_r$ present at the noninverting input to operational amplifier 72, which is normally the value of voltage source $V_{min}^*$. Similarly, the maximum value $V_{max}$ of input control signal $V_c$ is equivalent to the reference signal present at the noninverting input to operational amplifier 74, which is the value of voltage source $V_{max}^*$. Thus the value of the reference signal $V_r$ present at the noninverting input to operation amplifier 72 is ultimately translatable into the minimum switching signal frequency $F_{min}$ which can be generated from base drive circuitry 62, and the value of the reference signal $V_{max}^*$ present at the noninverting input to operational amplifier 74 is ultimately translatable into the maximum switching signal frequency $F_{max}$ which can be generated from base drive circuitry 62.

The following examples will serve to better explain the actual operation of limit circuit 58. Assume $V_{min}^*$ is set to 1 volt and $V_{max}^*$ set to 5 volts. Limit amplifier 58 will define a 4 volt window between 1 volt and 5 volts within which its output signal, second control signal $V_c'$, at junction z must be constrained. If the value of input control signal $V_c$ is between 1 volt and 5 volts, the input control signal is transferred unchanged to junction z and produced as second control signal $V_c'^{40}$. For such an input control value at junction x, operational amplifier 72 is saturated in a negative direction, which means diode 76 is reverse-biased or disabled. The input control signal $V_c$ is therefore applied directly to junction y and the inverting input of operational amplifier 74. Operational amplifier 74 will be saturated in a positive direction, which means inverse diode 78 is reverse-biased or disabled. The input control signal $V_c$ is therefore applied directly from junction y to junction z and produced by limit circuit 58 as second control signal $V_c'$.

As a second example, assume input control voltage $V_c$ is less than plus 1 volt, which would result from the negative error signal $V_e$ produced while inverter 10 is disabled (see FIG. 1 and the polarities within summer 54). In such case, the output voltage of operational amplifier 72 is clamped at 1 volt and diode 76 is forward-biased or enabled, allowing the 1 volt output from op amp 72 to be returned via junction y to junction x and the inverting input of operational amplifier 72. (The difference between the input control signal $V_c$ and the value at junction x is dropped across resistor $R_{d1}$). From junction y the 1 volt value is also applied to the inverting input of operational amplifier 74. Operational amplifier 74 is again saturated in a positive direction, disabling inverse diode 78. Thus, the 1 volt at junction y is applied directly to junction z and produced by limit circuit 58 as second control signal $V_c'$.

The present invention essentially involves restricting, for a selected time interval, the allowable window of control signal values which can be produced by limit circuit 58 to a reduced range of values translatable into a reduced, remote operating frequency range r. This may be implemented for the series resonant inverter described herein by defining the restricted window of control signal values to be near the high end of the normal operating window of control signal values. Therefore, the second control signal value $V_c'$ produced by limit circuit 58 will necessarily have a high value within this restricted window of control signal values, meaning that the switching signal frequency produced by control 50 will necessarily be remote from that end of the inverter operable range nearest resonance. The restricted window of control signal values may in fact be limited to just one value if desired, that is, the maximum value $V_{max}$ translatable into the maximum operating frequency $F_{max}$ of inverter 10 (see FIG. 2).

The restricted window of control signal values may be produced by employing maximum and minimum control circuitry 70 to raise the reference signal $V_r$ at the noninverting input to operational amplifier 72 above $V_{min}*$. There are many circuit embodiments for accomplishing this function. FIG. 5 illustrates one such embodiment. In maximum and minimum control circuit 70, a switch $S_o$ is commanded open simultaneously with enablement of inverter 10 and closed with return of inverter 10 to a disabled state. When inverter 10 is disabled and switch $S_o$ is closed, capacitor $C_s$ is in parallel with, and charged to a voltage equal to the voltage of, a voltage source $V_{start}$. The value of voltage source $V_{start}$ is selected to be larger than $V_{min}*$ but less than or equal to $V_{max}*$. The value of voltage source $V_{start}$ then will be the value of the reference signal present at the noninverting input to operational amplifier 72 which, as discussed, will necessarily be the value of second control signal $V_c'$ produced by limit circuit 58 while inverter 10 is disabled (Control 50 will attempt to operate inverter 10 as close to resonance as possible within the restricted window of control signal values in order to correct the large, negative error signal $V_e$ immediately following enablement). Thus, upon enablement of inverter 10, operation of transistors 12, 14, 16 and 18 at a frequency $F_{start}$ remote from resonance will be ensured (see FIG. 2).

In order for closed loop frequency control to function efficiently, the initially restricted window of control signal values at inverter enablement must be enlarged to correspond with the original, and presumably more efficient, window of control signal values defined by $V_{min}*$ and $V_{max}*$. In the embodiment discussed, this may be accomplished by sweeping the reference signal $V_r$ at the noninverting input to operational amplifier 72 from its initial value of $V_{start}$ down to a final value equal to $V_{min}*$. Referring to FIG. 5, it will be observed that reference signal $V_r$ at the noninverting input to operational amplifier 72 may be reduced in a controlled manner by opening switch $S_o$ simultaneous with enablement of inverter 10 (i.e., at time $t=0$). Once switch $S_o$ is opened, the charge on capacitor $C_s$ leaks off through resistor $R_{d2}$, and the value of reference signal $V_r$ consequently drops until voltage $V_r$ reaches a value equal to minimum voltage source $V_{min}*$. It is important that the time it takes for reference voltage $V_r$ to sweep from a value $V_{start}$ to a value $V_{min}*$ be longer than the integration time required by proportional plus integral regulator 56; otherwise, the second control signal $V_c$ produced by limit circuit 58 will return to a minimum value (i.e., a value translated into a switching signal frequency at or near resonance) too quickly and cause the transient problems following enablement specifically intended to be avoided by the present invention. The sweep time may be controlled by appropriately selecting values for capacitor $C_s$ and dropping resistor $R_{d2}$ in a well known manner. Upon return of inverter 10 to a disabled state, switch $S_o$ is again closed, allowing capacitor $C_s$ to recharge to the starting voltage $V_{start}$.

It will be noted from the above that this invention fully meets the objectives set forth. A resonant inverter having improved control upon enablement from a disabled state is provided. The resonant inverter control effectively eliminates excessive circulating currents within, or voltage across, the inverter's resonant elements, and also eliminates initial overshoot of, and oscillation about, a desired output load voltage or current upon inverter enablement.

Although one embodiment has been illustrated in the accompanying drawings and described in the foregoing description for a particular resonant dc-dc converter, it will be understood that the invention is not limited to the particular embodiment discussed but is capable of numerous rearrangements, modifications, and substitutions without departing from the scope of the invention. For example, the enablement control apparatus and method would be equally applicable to different resonant inverter configurations. Other changes, within the scope of the invention as defined by the appended claims, will suggest themselves to those skilled in this art.

What is claimed is:

1. Apparatus for providing a selected, substantially constant output voltage or current to a load, comprising:
   a resonant inverter having controllable switch means and a resonant circuit connected thereto, said controllable switch means providing a rectangular wave signal to the resonant circuit;
   means coupling the output of said resonant inverter to the load;
   stabilizing control means coupled to said inverter for varying the frequency of said rectangular wave signal within an operable range of said controllable switch means in such a manner as to maintain constant the selected output voltage or current;

inverter state switching circuitry included within said stabilizing control means for enabling or disabling switching of said controllable switch means; and limiter control means included within said stabilizing control means for controlling switching of said controllable switch means at the frequency of said rectangular wave signal within said operable range of said controllable switch means and remote from that end of said range nearest resonance, said limiter control means acting to controllably sweep said rectangular wave frequency toward said end nearest resonance whenever said inverter is enabled from a disabled state until the selected output voltage or current is obtained, thereby providing improved output voltage or current control.

2. The apparatus of claim 1, wherein said stabilizing control means further comprises:

comparison means for comparing a commanded output voltage or current to the actual output voltage or current, respectively, and providing a control signal in response thereto;

limiter means coupled to said comparison means and to said limiter control means for limiting said control signal to a value within an acceptable window of control signal values; and oscillator means coupled to said limiter means and responsive to the control signal as limited by said limiter means for generating a controlled frequency signal, said oscillator means being coupled to said controllable switch means, whereby said acceptable window of control signal values is translated by said oscillator means into said controlled frequency signal in a range of frequencies within which said controllable switch means will operate.

3. The apparatus of claim 2, wherein said limiter control means comprises:

restricting means for restricting, at inverter enablement, the acceptable window of control signal values defined by said limiting means to a narrowed window of control signal values translatable into a frequency signal range remote from that end of the operable range of said controllable switch means nearest resonance; and enlarging means for controllably enlarging said narrowed window of control signal values following inverter enablement until said narrowed window coincides with said acceptable window of control signal values, whereby at inverter enablement said controllable switch means will be initiated at a frequency remote from resonance and controllably swept toward resonance as said narrowed window of control signal values is controllably enlarged until the selected output voltage or current is obtained.

4. The apparatus of claim 2, wherein said comparison means exhibits a predetermined integration interval and said enlarging means exhibits a selected sweep interval of longer duration than said integration interval.

5. The apparatus of claim 3, wherein the operable frequency range of said controllable switch means is above the resonant frequency of said resonant circuit and wherein the acceptable window of control signal values defined by said limiting means has preset minimum and maximum values, said preset minimum value being translatable by said oscillator means for a frequency signal at the end of said operable range nearest resonance.

6. The apparatus of claim 5, wherein said restricting means comprises means for raising the minimum value of said acceptable window of control signal values to a starting value above said preset minimum value and less than or equal to said preset maximum value.

7. The apparatus of claim 6, wherein said enlarging means comprises means for sweeping the minimum value of said acceptable window of control signal values from said starting value to said preset minimum value following inverter enablement.

8. The apparatus of claim 7, wherein said means for raising the minimum value of said acceptable window of control signal values comprises input voltage means for providing said limiting means with said starting value and overriding said preset minimum value.

9. The apparatus of claim 8, wherein said means for sweeping the minimum value of said acceptable window of control signal values comprises:

switch means connected in series with said input voltage means;

capacitive means connected in parallel with the series combination of said switch means and said input voltage means; and resistive means coupled in parallel with said capacitive means, said switch means being closed while said inverter is in a disabled state so that said capacitive means charges to a voltage equal to said starting value provided by said input voltage means, said switch means being opened when said inverter is enabled so as to allow said capacitive means to discharge across said resistive means and sweep the minimum value of said acceptable window of control signal values from said starting value to said preset minimum value.

10. An improved control for a resonant inverter, said inverter having controllable switch means which provide a rectangular wave signal to a resonant circuit, the output of said inverter being coupled to and providing a selected, substantially constant output voltage or current to a load, said improved control comprising:

stabilizing control means coupled to said inverter for varying the frequency of said rectangular wave signal within an operable range of said controllable switch means in such a manner as to maintain constant the selected output voltage or current;

inverter state switching circuitry included within said stabilizing control means for enabling or disabling switching of said controllable switch means; and limiter control means included within said stabilizing control means for initiating switching of said controllable switch means at the frequency of said rectangular wave signal within said operable range of said controllable switch means and remote from that end of said range nearest resonance, said limiter control means acting to controllably sweep said rectangular wave signal frequency toward said end nearest resonance whenever said inverter is enabled from a disabled state until the selected output voltage or current is obtained, thereby providing improved output voltage or current control.

11. The improved control of claim 10, wherein said stabilizing control means further comprises:

comparison means for comparing a commanded output voltage or current to the actual output voltage or current, respectively, and providing a control signal in response thereto;

limiter means coupled to said comparison means and to said limiter control means for limiting said control signal to a value within an acceptable window of control signal values; and oscillator means coupled to said limiter means and responsive to the control signal as limited by said limiter means for generating a controlled frequency signal, said oscillator means being coupled to said controllable switch means, whereby said acceptable window of control signal values is translated by said oscillator means into said controlled frequency signal in a range of frequencies within which said controllable switch means will operate.

12. The improved control of claim 11, wherein said enablement control means comprises:

restricting means for restricting, at inverter enablement the acceptable window of control signal values defined by said limiting means to a narrowed window of control signal values translatable into a frequency signal range remote from that end of the operable range of said controllable switch means nearest resonance; and enlarging means for controllably enlarging said narrowed window of control signal values following inverter enablement until said narrowed window coincides with said acceptable window of control signal values, whereby at inverter enablement said controllable switch means will be initiated at a frequency remote from resonance and controllably swept toward resonance as said narrowed window of control signal values is controllably enlarged until the selected output voltage or current is obtained.

13. The improved control of claim 12, wherein said comparison means exhibits a predetermined integration interval and said enlarging means exhibits a selected sweep interval of longer duration than said integration interval.

14. A method for controlling a resonant inverter, said inverter having controllable switch means which provide a rectangular wave signal to a resonant circuit, the output of said inverter being coupled to and providing a selected, substantially constant output voltage or current to a load, said method comprising the steps of:

varying the frequency of said rectangular wave signal within an operable range of said controllable switch means in such a manner as to maintain the desired output voltage or current;

initiating switching of said controllable switch means, upon enablement of said inverter, at the frequency of said rectangular wave signal within said operable range of said controllable switch means and remote from that end of said range nearest resonance; and controllably sweeping said rectangular wave signal frequency toward said end nearest resonance until the selected output voltage or current is obtained, thereby providing improved output voltage or current control whenever said inverter is enabled from a disabled state.

* * * * *